(12) United States Patent
Mok et al.

(10) Patent No.: US 8,848,152 B2
(45) Date of Patent: Sep. 30, 2014

(54) DISPLAY SUBSTRATE

(71) Applicant: Samsung Display Co., Ltd., Yongin (KR)

(72) Inventors: Seon-Kyoon Mok, Hwaseong-si (KR); Si-Hyun Ahn, Cheonan-si (KR); Woo-Jung Shin, Incheon (KR); Byoung-Sun Na, Hwaseong-si (KR); So-Young Kim, Jeju-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/924,081

(22) Filed: Jun. 21, 2013

(65) Prior Publication Data

US 2013/0278580 A1 Oct. 24, 2013

Related U.S. Application Data (63) Continuation of application No. 12/955,582, filed on Nov. 29, 2010, now abandoned.

(30) Foreign Application Priority Data

Jun. 14, 2010 (KR) .................. 10-2010-0056032

(51) Int. Cl.
  *G02F 1/1345* (2006.01)
  *G09G 3/36* (2006.01)
  *G02F 1/1362* (2006.01)
  *G02F 1/133* (2006.01)

(52) U.S. Cl.
  CPC ........ *G02F 1/136286* (2013.01); *G09G 3/3696* (2013.01); *G02F 1/133* (2013.01)
  USPC ........................................... 349/149; 349/152

(58) Field of Classification Search
  USPC ........................................ 349/149, 151, 152
  See application file for complete search history.

(56) References Cited

U.S. PATENT DOCUMENTS

| | | | |
|---|---|---|---|
| 7,705,942 B2 | 4/2010 | Liao | |
| 2004/0032559 A1* | 2/2004 | Kim et al. | ..... 349/153 |
| 2005/0078057 A1 | 4/2005 | Chang et al. | |
| 2008/0158462 A1* | 7/2008 | Matsuoka et al. | ..... 349/46 |
| 2009/0122213 A1* | 5/2009 | Ko et al. | ..... 349/46 |
| 2011/0075089 A1* | 3/2011 | Jheng | ..... 349/152 |

FOREIGN PATENT DOCUMENTS

| | | |
|---|---|---|
| JP | 2005-099414 A | 4/2005 |
| JP | 2008-242393 A | 10/2008 |
| KR | 100273300 B1 | 9/2000 |

* cited by examiner

*Primary Examiner* — Thanh-Nhan P Nguyen
(74) *Attorney, Agent, or Firm* — Innovation Counsel LLP (57) ABSTRACT

A display substrate includes a plurality of gate lines extending in a first direction and arranged in a second direction in a display area of the display substrate, an alignment film formed in the display area and in an end area adjacent to end portions of the gate lines in a peripheral area surrounding the display area, and a plurality of circuit stages formed in the end area to connect to the gate lines and a dummy stage connected to a last circuit stage of the circuit stages. Each of the circuit stages includes a gate driving circuit disposed at the higher portion the gate line corresponding to the circuit stages and a gate connecting line formed in the peripheral area between the display area and the gate driving circuit to connect each of the circuit stages with each of the gate lines.

10 Claims, 8 Drawing Sheets

DISPLAY SUBSTRATE

PRIORITY STATEMENT

This application is a continuation of U.S. Ser. No. 12/955,582 filed Nov. 29, 2010 where the latter claims priority under 35 U.S.C. §119 to Korean Patent Application No. 10-2010-56032, filed on Jun. 14, 2010, in the Korean Intellectual Property Office (KIPO), where the disclosures of both said applications are incorporated herein by reference in their entirety.

BACKGROUND

1. Field of Disclosure

The present disclosure of invention relates to a display substrate, and more particularly to a display substrate used for a liquid crystal display (LCD) device.

2. Description of Related Technology

Generally, a liquid crystal display (LCD) panel includes a display substrate having an array of thin-film transistors (TFTs) integrally provided thereon for driving respective pixel-electrodes of respective pixels, an opposite substrate facing the display substrate and having a common electrode, and a liquid crystal layer disposed between the display substrate and the opposite substrate. In the LCD panel, electric fields of respective intensity and/or orientation are applied to the liquid crystal layer to control light transmissivity, so that a desired image can be displayed.

In addition to the basic LCD panel, the typical LCD device includes a gate driving part structured for outputting gate signals to corresponding gate lines of the display substrate and a data driving part structured for outputting data signals to corresponding data lines of the display substrate. The gate lines are typically provided as extending substantially perpendicular to the data lines. The gate and data driving parts are generally mounted on the LCD panel in the form of respective monolithically integrated circuits or chips.

Recently, in order to decrease a total size of the LCD panel and improve manufacturability of the LCD panel, the gate driving part and/or the data driving part are(is) directly and monolithically integrated on the display substrate. When the gate driving part is directly integrated on the display substrate, it typically includes a circuit part for generating synchronized gate signals and a plurality of signal lines for transmitting synchronous driving signals and/or other signals to the circuit part. The circuit part typically includes a plurality of metal patterns, and the metal patterns are formed by patterning metal layers of different deposition steps (e.g., metal-1, metal-2). The metal layers may include one or more metals also used for forming the TFTs of the display pixels. During manufacture, it is possible for shorts to develop between crossing portions of a first metal pattern and of a second metal pattern so that the gate driving part becomes misoperated in that shorted section as a result.

SUMMARY

Example embodiments in accordance with the disclosure provide a display substrate having enhanced reliability in an electric connection between a gate driving part and a wiring part.

In an example display substrate according to the present disclosure, the display substrate includes a plurality of gate lines, an alignment film, a gate driving circuit and a gate connecting line. The gate lines extend in a first direction and are arranged in a second direction in a display area of the display substrate. The alignment film is formed in the display area and in an end area adjacent to end portions of the gate lines in a peripheral area surrounding the display area. The gate driving circuit is formed in the end area and includes a plurality of circuit stages connected to the gate lines and a dummy stage connected to a last circuit stage of the circuit stages, and each of the circuit stages is disposed at an upper portion of the gate line corresponding to the circuit stage. The gate connecting line is formed in the peripheral area between the display area and the gate driving circuit to connect each of the circuit stages with each of the gate lines. In another example display substrate according to the present invention, the display substrate includes a plurality of gate lines, an alignment film, a gate driving circuit and a wiring part. The gate lines extend in a first direction, and are arranged in a second direction in a display area of the display substrate. The alignment film is formed in the display area and in a first area adjacent to end portions of the gate lines in a peripheral area surrounding the display area. The gate driving circuit comprises a plurality of circuit stages and a dummy stage, the circuit stages being formed in the first area and being connected to the gate lines, the dummy stage being connected to a last circuit stage of the circuit stages and being formed in a second area arranged in the second direction of the first area. The wiring part is formed in the peripheral area and comprises a first signal line, a second signal line and a first connecting line, the first signal line extending in the second direction and being adjacent to the gate driving circuit, the second signal line being disposed between the first signal line and the gate driving circuit, and the first connecting line connecting the second signal line and the dummy stage, a portion of the first connecting line intersecting with the second signal line being formed in the first area.

The display substrate may further include a sub-gate line formed adjacent to each of the gate lines of the display area. The circuit stages may include first sub-stages connected to first to m-th gate lines (in is a natural number) of the gate lines and second sub-stages formed in the end area, connected to (m+1)-th to n-th gate lines (n is a natural number more than m) and connected to first to (n−m)-th sub-gate lines.

The wiring part may further comprises a second connecting line connecting the first signal line to the third sub-stage, and a portion of the second connecting line intersecting with the second signal line is disposed in the first area.

The second and third sub-stages may be disposed at a lower portion of the sub-gate lines corresponding to the second and third sub-stages.

According to present disclosure of invention, a portion of a power supply cross-connecting line formed in a second conductor layer (e.g., metal-2) is connected to a power supply supplying line formed in a first conductor layer (e.g., metal-1) and the crossing over of the power supply cross-connecting line (metal-2) with other signal supplying lines formed in a first conductor layer (e.g., metal-1) are covered by the alignment film. Thus, the wiring of the gate driving part may be prevented from being defected, so that driving reliability of the gate driving part may be enhanced.

BRIEF DESCRIPTION OF THE DRAWINGS

The above and other features and advantages of the present invention will become more apparent by describing in detail the preferred embodiments thereof with reference to the accompanying drawings, in which.

DETAILED DESCRIPTION

Hereinafter, the present disclosure of invention will be explained in more detail with reference to the accompanying drawings.

Figure 1:
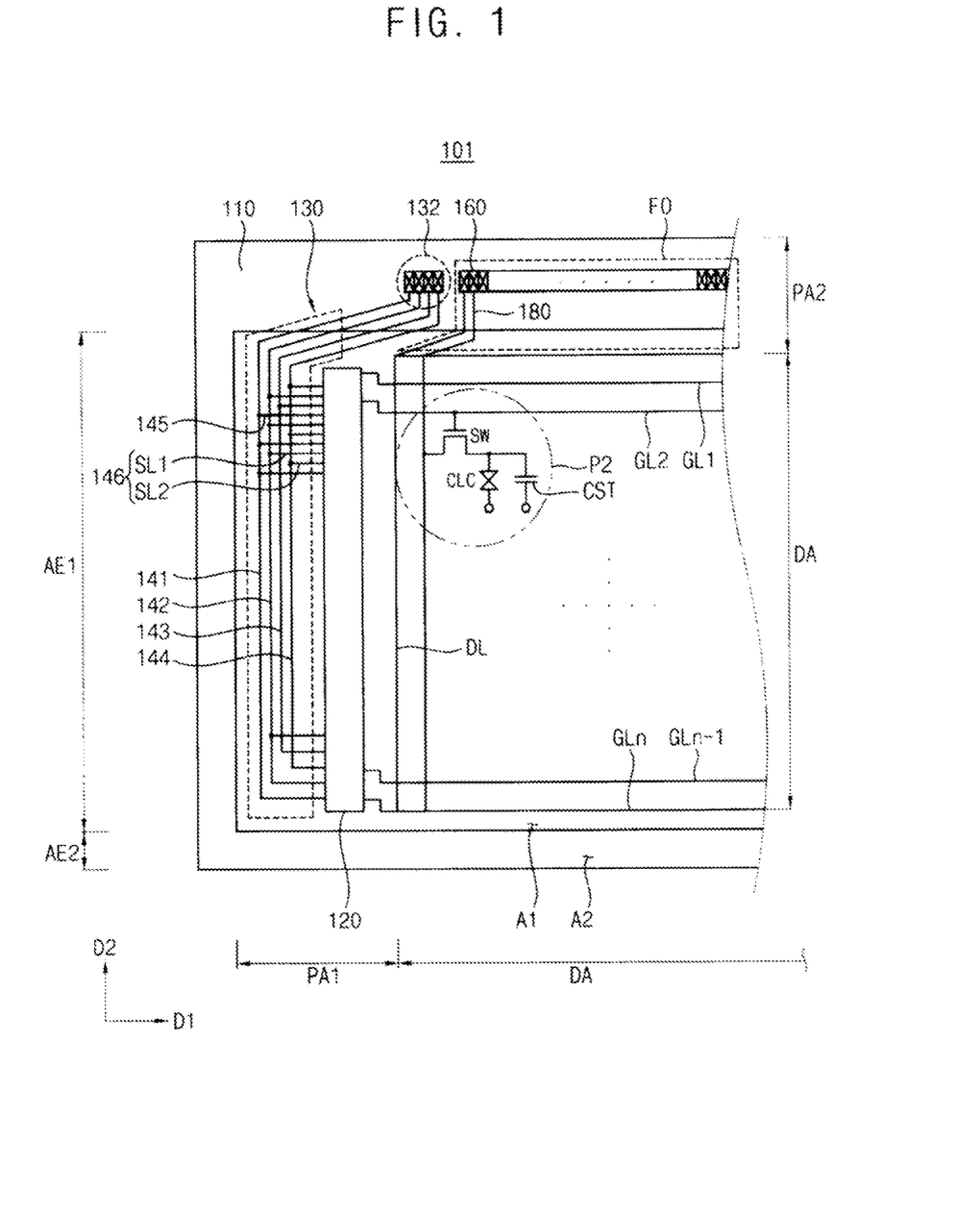
FIG. 1 is a plan view illustrating a display substrate according to a first example embodiment.

FIG. 1 is a top view schematic illustrating a display substrate according to an exemplary embodiment in accordance with the present disclosure.

Referring to FIG. 1, the display substrate 101 (monolithically integrated TFTs array substrate) according to the present example includes a plurality of gate lines GL1, GL2, . . . , GLn−1 and GLn, a plurality of data lines DL, a plurality of pixel units exemplified by illustrated pixel P22, an alignment film (not shown, but understood to be used for aligning liquid crystal molecules), a gate driving circuit 120, a wiring part 130, a gate-drive signal pads part 132 and a fan out part FO which are formed on an electrically insulative and transparent substrate 110. The substrate 110 is divided into a display area DA where the image is formed and peripheral areas PA1 and PA2 surrounding the display area DA but where images need not be formed.

Although not shown in the figures, an area in which the alignment film is formed is referred to as an alignment film area A1 of the substrate 110, and an area in which the alignment film is not formed and surrounds the alignment film area A1 is referred to as an alignment film-free area A2. The alignment film area A1 according to the present example embodiment is defined as a polygon having two first sides extending in a first direction D1 of the substrate 110 and two second sides extending in an orthogonal second direction D2. The first sides are straight lines extending in the first direction D1. The alignment film area A1 is thus defined as a rectangle shape and the alignment film free area A2 is a rectangular ring shape surrounding the alignment film area A1.

The display area DA is disposed in the alignment film area A1. The gate lines, GL1, GL2, . . . , GLn−1 and GLn, the data lines, DL and the pixels P (only one shown, P22) are formed in the display area DA. The gate lines GL1, GL2, . . . , GLn−1 and GLn extend in the first direction D1 and are successively arranged spaced apart from one another in the second direction D2. The data lines DL extend in the second direction D2 and are successively arranged to be spaced apart from one another in the first direction D1. Each of the pixels includes a switching element SW (e.g., a TFT) connected to an adjacent gate line portion and an adjacent data line portion of the gate and data lines, a liquid crystal capacitor CLC connected to the switching element SW and a storage capacitor CST connected to the switching element SW.

The gate driving circuit 120, the wiring part 130, the gate-drive signal pads part 132 and the fan out part FO are formed in the peripheral areas PA1 and PA2. The peripheral areas PA1 and PA2 may be divided into a first end area PA1 adjacent to an end portion of the gate lines GL1, GL2, . . . , GLn−1 and GLn, and a second end area PA2 in which an end portion of the data lines DL is formed. A portion of the first end area PA1 is included in the alignment film area A1, and a remaining portion of the first end area PA1 is included in the alignment film free area A2. The second end area PA2 is included in the alignment film free area A2. The gate driving circuit 120 and the wiring part 130 are formed in the first end area PA1, and the gate-drive signal pads part 132 and the fan out part FO are formed in the second end area PA2. Hereinafter, the alignment film area covered portion of the first end area PA1 is defined as a first area AE1, and an area of the first end area PA1 in which the alignment film is not formed and disposed adjacent to the first area AE1 along the second direction is defined as a second area AE2.

The gate driving circuit 120 is connected to the end portion of the gate lines GL1, GL2, . . . , GLn−1 and GLn, and outputs gate signals to the gate lines GL1, GL2, . . . , GLn−1 and GLn. The gate driving circuit 120 is formed in the first end area PA1 adjacent to the display area DA as well as being formed in the AE1 area.

The wiring part 130 receives driving signals for driving the gate driving circuit 120 from outside and applies the received driving signals to the gate driving circuit 120. For example, the wiring part 130 includes a first voltage-supplying line 141 that supplies a corresponding first voltage supply signal VSS. The wiring part 130 further includes a first clock line 142 transmitting a first clock signal CKA and a second clock line 143 transmitting a second, different phased, clock signal CKB. In one embodiment, the CKB is 180 degrees out of phase with CKA and is therefore referred to as clock-bar. The wiring part 130 yet further includes a scan-starting line 144 transmitting a vertical start signal STY. In addition, the wiring part 130 includes a plurality of voltage supply cross-connecting lines 145 and a plurality of clock cross-connecting lines 146. The starting line 144, the second clock line 143, the first clock line 142 and the voltage supplying line 141 may be formed by patterning a gate metal layer that is simultaneously patterned in forming the gate lines GL1, GL2, . . . , GLn−1 and GLn. The voltage supply cross-connecting lines 145 and the clock cross-connecting lines 146 are formed by patterning a data metal layer that is simultaneously patterned in forming the data lines DL. The data metal layer is different from the gate metal layer, where the latter is patterned to form wiring portions 141-144, namely, the starting line 144, the first clock line 142, the second clock line 143 and the voltage supplying line 141. An insulating layer (not shown) is disposed between the gate metal layer (metal-1) and the data metal layer (metal-2). The first and second metal patterns are thus substantially insulated from each other by the insulating layer.

The voltage supplying line 141 extends in the first direction D1 along which the data lines DL also extend. The voltage supply cross-connecting lines 145 extend in the second direction D2 to connect the voltage supplying line 141 with the gate driving circuit 120. The first clock line 142 and the second clock line 143 extend in the first direction D1 substantially parallel with the voltage supplying line 141. The clock cross-connecting line 146 includes a first sub-line SL1 connecting the first clock line 142 to the gate driving circuit 120 and a second sub-line SL2 connecting the second clock line 143 to the gate driving circuit 120. The first and second sub-lines SL1 and SL2 extend in the second direction D2. The starting line 144 is connected to the gate driving circuit 120 where the latter is connected to first and n-th gate lines GL and GLn of the gate lines GL1, GL2, . . . , GLn−1 and GLn. The starting line 144, the second clock line 143, the first clock line 142 and the voltage supplying line 141 are disposed in the recited order so as to be successively farther away from the gate driving circuit 120. Thus, the voltage supply cross-connecting line 145 crosses over the second clock line 143 and the first clock line 142 as well as the starting line 144.

Detailed structures and connections of the gate driving circuit 120, the display area DA and the wiring part 130 are explained below referring to FIG. 2.

The gate-drive signal pads part 132 receives driving signals for driving the gate driving circuit 120 from an outside source; for example from lines of a flexible printed circuit whose ends make electrical contact with pads of the gate-drive signal pads part 132. The externally-supplied driving signals include the voltage supply signal VSS, the first clock signal CKA, the second clock signal CKB and the vertical start signal STV. Thus, the gate-drive signal pads part 132 is understood to include a corresponding plurality of contact or connection pads structured to respectively receive the driving signals from an appropriate external connecting means.

The fan out part FO includes a data pads part 160 having data pads electrically connected to the date lines DL respectively, and an output lines part 180 having output lines respectively connecting the data pads to the data lines DL. The data pads part 160 receives the data signals outputted from a data driving circuit (not shown) electrically connected with a flexible printed circuit (FPC, not shown). The output lines part 180 has fanning-out lines that transmit the data signals received through the closely grouped pads of the data pads part 160 to the more spaced apart data lines DL.

Figure 2:
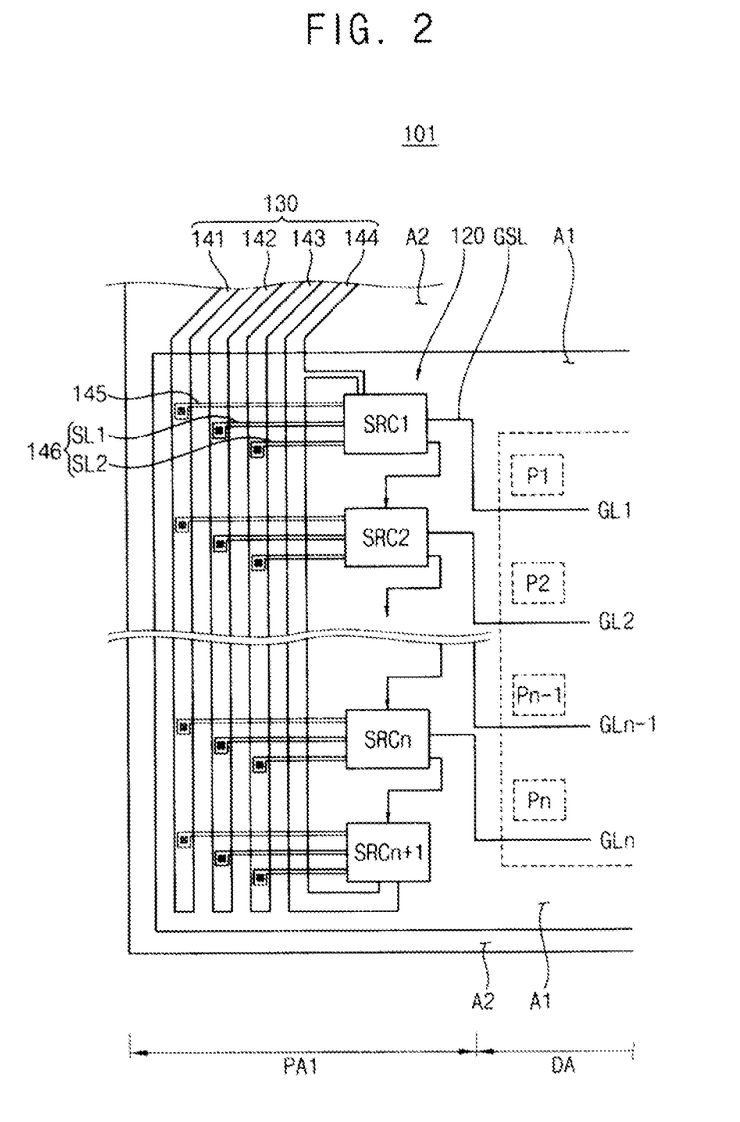
FIG. 2 is an enlarged plan view illustrating the display substrate in FIG. 1.

FIG. 2 is an enlarged plan view illustrating the display substrate in FIG. 1.

Referring to FIG. 2, the gate driving circuit 120 includes n (where n is a natural number greater than 1) circuit stages SRC1, SRC2, . . . , SECn−1 and SRCn connected to each other, and a dummy stage SRCn+1 connected to an n-th circuit stage SRCn which is a last gate line driving circuit stage of the circuit stages SRC1, SRC2, . . . , SECn−1 and SRCn. In the circuit stages SRC1, SRC2, . . . , SRCn−1 and SRCn, the first circuit stage SRC1 is connected to the second circuit stage SRC2, and the second circuit stage SRC2 is connected to a third circuit stage (not shown) and so on.

Each of the circuit stages SRC1, SRC2, . . . , SRCn−1 and SRCn is connected to the voltage supply line 141 through a corresponding voltage supply cross-connecting line 145, and to the first clock line 142 through the first sub-line SL1, and to the second clock line 143 through the second sub-line SL2. The dummy stage SRCn+1 is also connected to the voltage supplying line 141 through the voltage supply cross-connecting line 145, the first clock line 142 through the first sub-line SL1, and the second clock line 143 through the second sub-line SL2. The starting line 144 is connected to the first circuit stage SRC1 and to the dummy stage SRCn+1, but need not be connected to any of the intermediate stages.

The first circuit stage SRC1 is connected to the first gate line GL1, and the second circuit stage SRC2 is connected to the second gate line GL2 disposed adjacent to the first gate line GL1 along the second direction D2. In addition, the n-th circuit stage SRCn is connected to the n-th gate line GLn adjacent to a lower portion of the display area DA.

The circuit stages SRC1, SRC2, . . . , SRCn−1 and SRCn are respectively disposed at comparatively higher portions of the display substrate (higher up in the D2 direction) than are the gate lines GL1, GL2, . . . , GLn−1 and GLn which are respectively connected to the circuit stages SRC1, SRC2, . . . , SRCn−1 and SRCn, as illustrated in FIG. 2. For example, each of the circuit stages SRC1, SRC2, . . . , SRCn−1 and SRCn is disposed more closely to the gate-drive signal pads part 132 than are each of the gate lines GL1, GL2, . . . , GLn−1 and GLn respectively connected to the circuit stages SRC1, SRC2, . . . , SRCn−1 and SRCn. For example, the first circuit stage SRC1 is disposed at the higher portion of the display substrate than the first gate line GL1. In addition, the second circuit stage SRC2 is disposed at the higher portion of the display substrate than the second gate line GL2. In addition, the n-th circuit stage SRCn is disposed at the higher portion of the display substrate than the n-th gate line GLn.

According to a disposition between the circuit stages SRC1, SRC2, . . . , SRCn−1 and SRCn and the gate lines GL1, GL2, . . . , GLn−1 and GLn as mentioned above, the display substrate 101 includes a plurality of L-shaped or S-shaped gate connecting lines GSL respectively connecting the circuit stages SRC1, SRC2, . . . , SECn−1 and SRCn with the lower disposed gate lines GL1, GL2, . . . , GLn−1 and GLn. The gate connecting lines GSL are formed in the first end area PA1 between the display area DA and the gate driving circuit 120. Each of the gate connecting lines GSL extends at least in the second direction D2, and may respectively connect the circuit stages SRC1, SRC2, . . . , SRCn−1 and SRCn to the gate lines GL1, GL2, . . . , GLn−1 and GLn.

According to the present example embodiment, though the alignment film area A1 is designed like the rectangular shape in a plan view, the gate driving circuit 120 is entirely formed in the first area AE1 and the gate connecting lines GSL are also entirely formed in the first area AE1 where it will be recalled that the gate connecting lines GSL connect the gate driving circuit 120 to the gate lines GL1, GL2, . . . , GLn−1 and GLn. Portions in which the voltage supply cross-connecting line 145 intersects with the first and second clock lines 142 and 143 may also be entirely formed in the first area AE1 that is the alignment film area A1. Accordingly, the gate driving circuit 120 is covered by the alignment film, so a burn between the first metal pattern and the second metal pattern formed from metals different from each other may be prevented.

In addition, reliability of arranging the alignment film on the display substrate 101 in forming the alignment film area A1 having a rectangular shape is higher than in forming alignment film area A1 having an in- and out zig-zagging polygon shape that covers the gate driving circuit 120 and the display area DA. Therefore, the lower portion of the gate driving circuit 120 is covered by alignment material substantially the same as is the lower portion of the display area DA without changing a plane design of the alignment film area A1, so that the reliability of the arrangement in forming the alignment film may be enhanced.

Figure 3:
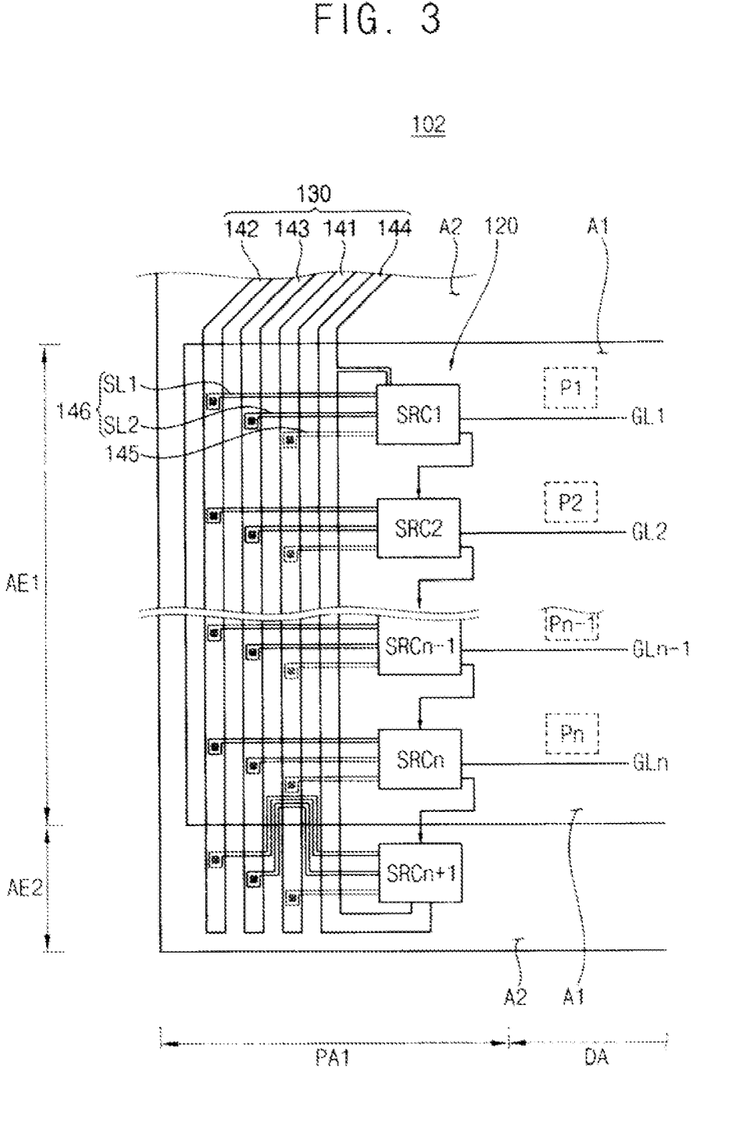
FIG. 3 is an enlarged plan view illustrating a display substrate according to another example embodiment.

FIG. 3 is an enlarged plan view illustrating a display substrate according to another example embodiment.

Referring to FIG. 3, the display substrate 102 according to the present example embodiment includes the gate lines GL1, GL2, . . . , GLn−1 and GLn, the pixels P1, P2, . . . , Pn−1 and Pn, the gate driving circuit 120 and the wiring part 130. The display substrate 102 according to the present example embodiment is substantially the same as the display substrate according to the previous example embodiment in FIGS. 1 and 2 except for the location of the gate driving circuit 120, the connection between the gate driving circuit 120 and the gate lines GL1, GL2, . . . , GLn−1 and GLn, and the design (layout) of the wiring part 130. Thus, any repetitive explanation concerning the above elements will be omitted.

The gate driving circuit 120 is formed in the first area AE1 which is the portion under the alignment film area A1 and the second area AE2 which is the portion that is not under the alignment film and is denoted as alignment-free area A2. For example, the n ('n' is a natural number greater than 1) circuit stages SRC1, SRC2, . . . , SRCn−1 and SRCn of the gate driving circuit 120 connected with each other are formed in the first area AE1. The dummy stage SRCn+1 connected to the n-th circuit stage SRCn that is a last stage of the circuit stages SRC1, SRC2, . . . , SRCn−1 and SRCn is formed in the second area AE2.

The circuit stages SRC1, SRC2, . . . , SRCn−1 and SRCn are directly connected to the gate lines GL1, GL2, . . . , GLn−1 and GLn, respectively, which extend in a first direction D1 of the display substrate 102 without additional connecting lines (without the GSL lines of FIG. 2).

In addition, each of circuit stages SRC1, SRC2, . . . , SRC(n−1), SRCn and dummy SRC(n+1) is connected to the starting line 144 extending in a second direction D2 different from the first direction D1, the Vss voltage supplying line 141 which is laid out in a position different from that of FIG. 2. Each of circuit stages SRC1 through dummy stage SRC(n+1) is further connected to the first clock line 142 and the second clock line 143. According to the present example embodiment, the starting line 144, the voltage supplying line 141, the second clock line 143 and the first clock line 142 are disposed in the recited order which progresses in a direction away from the gate driving circuit 120. Each of the circuit stages SRC1, SRC2, . . . , SRCn−1, SRCn and SRC(n+1) is respectively electrically connected to the wiring part 130 through a respective one of a plurality of the Vss voltage supplying cross-connecting lines 145 and the clock cross-connecting lines 146. The voltage supply cross-connecting lines 145 and the first and second sub-lines SL1 and SL2 of the clock connecting lines 146 extend in the first direction D1 to respectively intersect with the Vss voltage supplying line 141 and the clock supplying lines 142-143.

In addition, in the case of the dummy stage SRCn+1 is also connected to the voltage supplying lines 141 through the voltage supplying connecting lines 145, the second clock line 143 through the first sub-lines SL1 and the first clock line 142 through the second sub-line SL2. The first and second sub-lines SL1 and SL2 connected to the dummy stage SRCn+1 extend from the second area AE2 in which the dummy stage SRCn+1 is formed upwards an upper portion of the display area DA in the second direction D2. The first and second sub-lines SL1 and SL2 extending in the second direction D2 reach in the first area AE1 to intersect with the Vss voltage supplying line 141 in the first area AE1, and then extend.

Although not shown in the figures, the design of the first and second sub-lines SL1 and SL2 connected to each of the circuit stages SRC1 SRC2, . . . , SRCn−1 and SRCn may be changed similar to the design of the first and second sub-lines SL1 and SL2 connected to the dummy stage SRCn+1 as illustrated in FIG. 3.

According to the present example embodiment, though the alignment film area A1 is designed as a rectangular shape in a plan view and a portion of the gate driving circuit 120 is formed in the second area AE2, by altering the design of the first and second sub-lines SL1 and SL2, and thus a portion in which the first and second sub-lines SL1 and SL2 intersect with the voltage supplying line 141 may be entirely formed in the first area AE1. Accordingly, a burn out between the first and second sub-lines SL1 and SL2, and the Vss voltage connecting line 141 formed from metals different from each other may be prevented.

In addition, the area in which the first and second sub-lines SL1 and SL2, and the voltage supplying line 141 cross each other is entirely disposed in the first area AE1 without changing the contiguous plane design of the alignment film area A1, so that the reliability of arrangement in forming the alignment film may be enhanced.

Figure 4:
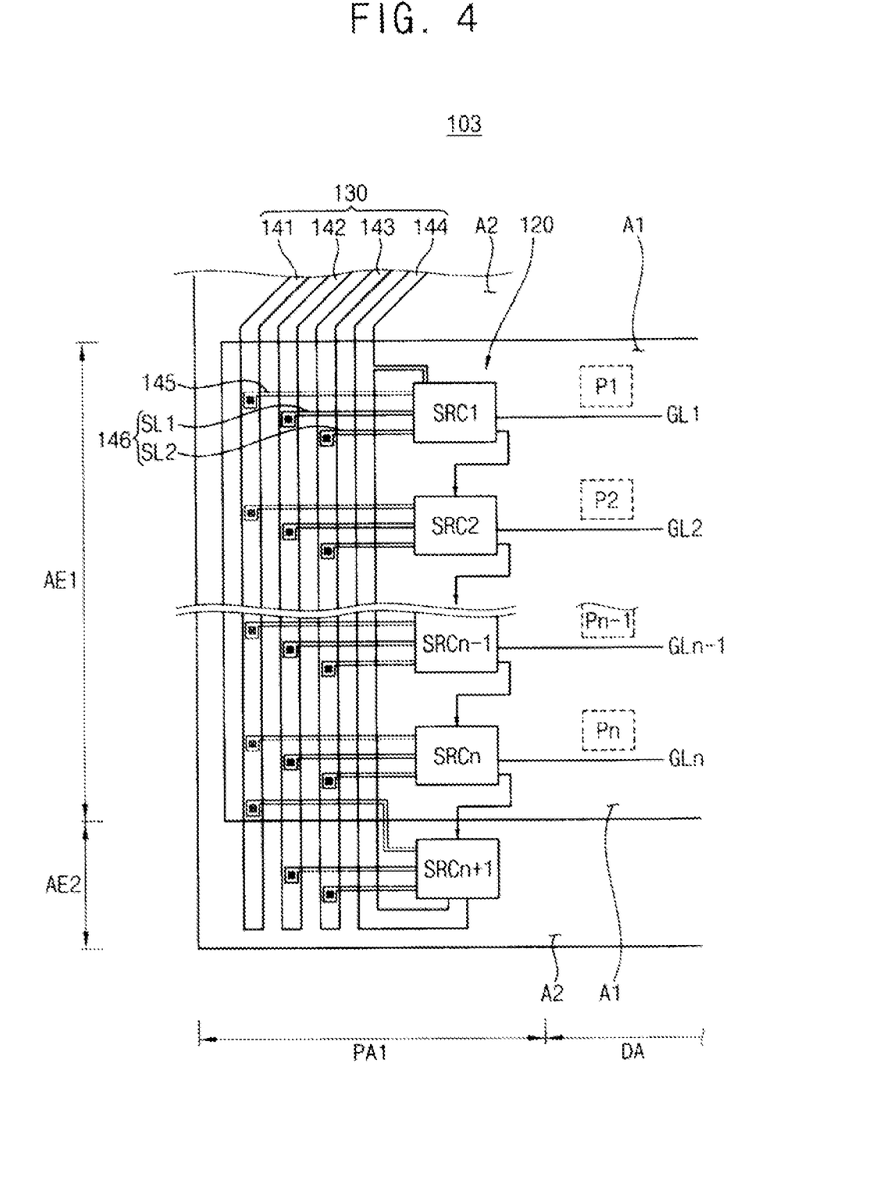
FIG. 4 is an enlarged plan view illustrating a display substrate according to still another example embodiment.

FIG. 4 is an enlarged plan view illustrating a display substrate according to still another example embodiment.

Referring to FIG. 4, the display substrate 103 according to the present example embodiment includes the gate lines GL1, GL2, . . . , GLn−1 and GLn, the pixels P1, P2, . . . , Pn−1 and Pn, the gate driving circuit 120 and the wiring part 130. The display substrate 103 according to the present example embodiment is substantially the same as the display substrate 102 according to the previous example embodiment in FIG. 3 except for the design (layout) of the wiring part 130. Thus, any repetitive explanation concerning the above elements will be omitted.

The wiring part 130 includes the starting line 144, the first clock line 142, the second clock line 143 and the voltage supplying line 141. According to the present example embodiment, the starting line 144, the second clock line 143, the first clock line 142 and the voltage supplying line 141 are disposed in the recited order progressively away from the gate driving circuit 120. Each of circuit stages SRC1, SRC2, . . . , SRCn−1, SRCn and SRC(n+1) of the gate driving circuit 120 is electrically connected to the wiring part 130 through the Vss voltage supplying cross-connecting lines 145 and the clock cross-connecting lines 146. The Vss voltage supplying cross-connecting lines 145 cross over the first and second clock lines 142 and 143 while being covered by the alignment film A1.

In addition, in the case of the dummy stage SRCn+1, its respective is also connected to the voltage supplying line 141 through the voltage supplying connecting line 145, the second clock line 143 through the first and second sub-lines, SL1 and SL2 are formed in and the first clock line 142 through the first sub-lines SL1. The voltage supplying connecting line 145 connected to the dummy stage SRCn+1 extend from the film-free second area AE2 in which the dummy stage SRCn+1 is formed head to an upper portion of the display area DA in the second direction D2. The voltage supplying connecting line 145 extending in the second direction D2 reaches in the first area AE1, and extends in the first direction D1. Thus, the voltage supplying connecting line 145 intersects with the first and second clock lines 142 and 143, and extends to the voltage supplying line 141 to be connected to the voltage supplying line 141 disposed in the first area AE1.

Although not shown in the figures, the design of the Vss voltage supplying cross-connecting lines 145 connected to each of the circuit stages SRC1, SRC2, . . . , SRCn−1 and SRCn may be alternated to the design of the voltage supplying connecting lines connected to the dummy stage SRCn+1 as illustrated FIG. 4.

According to the present example embodiment, though the alignment film area A1 is designed as a contiguous rectangular shape in a plan view and a portion of the gate driving circuit 120 is formed in the second area AE2, by altering the design of the voltage supplying connecting lines 145, and thus a portion in which the voltage supplying connecting lines 145 intersect with the first and second clock lines 142 and 143 may be formed entirely in the first area AE1 that is the alignment film area A1. Accordingly, a burn out between the voltage supplying connecting lines and the first and second clock lines 142 and 143 formed from metals differ from each other may be prevented.

In addition, the area in which the voltage supplying connecting lines 145 and the first and second clock lines 142 and 143 cross each other is entirely disposed in the first area AE1 without changing the contiguous plane design of the alignment film area A1, so that the reliability of arrangement in forming the alignment film may be enhanced.

Figure 5:
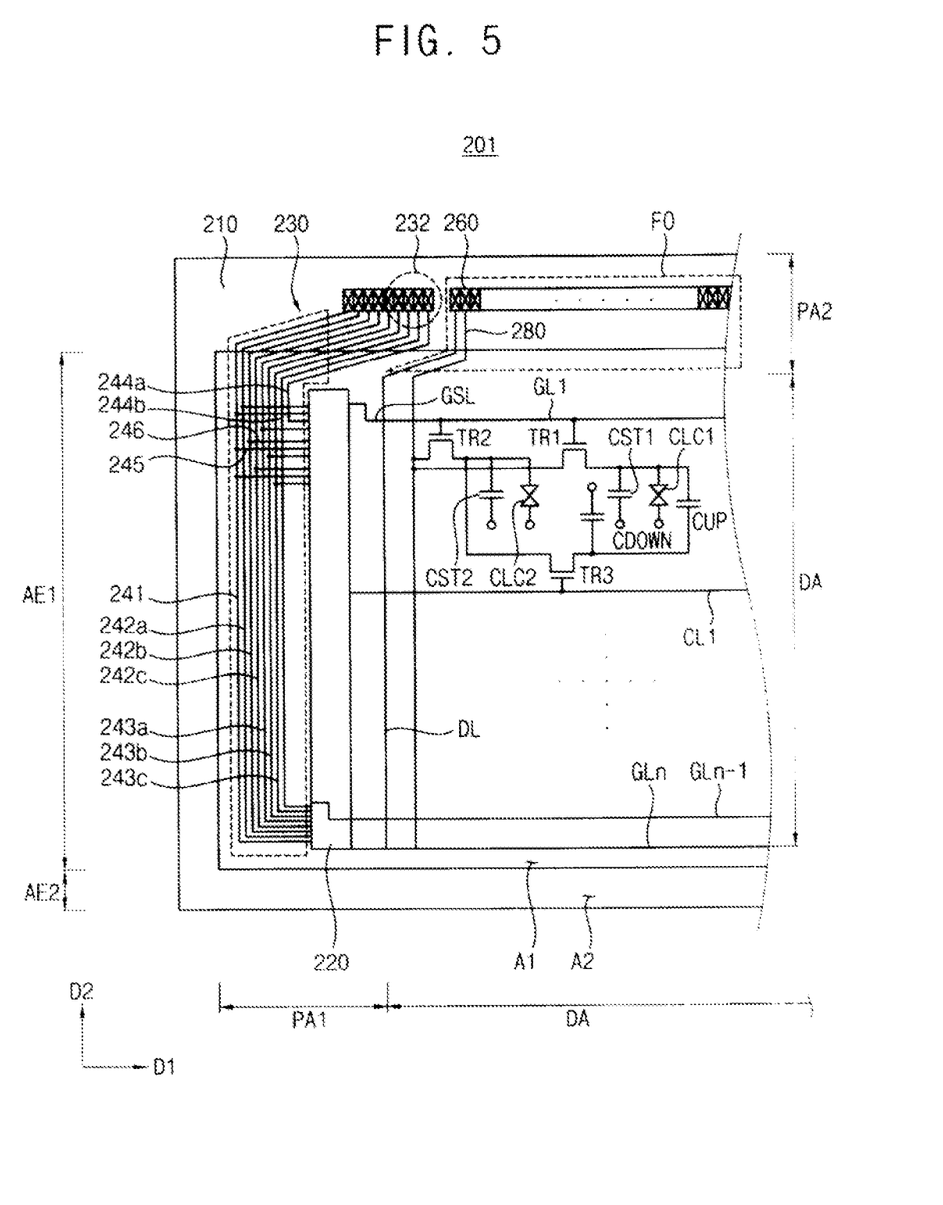
FIG. 5 is a plan view illustrating a display substrate according to still another example embodiment.

FIG. 5 is a plan view illustrating a display substrate according to still another example embodiment.

Referring to FIG. 5, the display substrate 210 according to the present example embodiment includes the gate lines GL1 GL2, . . . , GLn−1 and GLn formed, the sub-gate lines GL1, GL2, . . . , GLn−1 and GLn, the data lines DL, the pixels P1, P2, . . . , Pn−1 and Pn, the alignment film (not shown), a gate driving circuit 220, a wiring part 230, a signal pads part 232 and a fan out part FO.

Although not shown in the figures of the present example embodiment, an area in which the alignment film (not shown) is a formed is referred to as the alignment film area A1 of the substrate 210 and an area in which the alignment film is not formed and surrounds the alignment film area A1 is referred to an alignment film free area A2. The alignment film area A1 and the alignment film free area A2 are substantially the same as those in FIG. 1, and thus, any repetitive explanation concerning the above elements will be omitted.

The display area DA is disposed in the alignment film area A1. The gate lines GL1, GL2, . . . , GLn−1 and GLn, the sub-gate lines CL1, CL2, . . . , CLn−1 and CLn, the data lines DL, and the pixels P are formed in the display area DA. The gate lines GL1, GL2, . . . , GLn−1 and GLn extend in the first direction D1, and are arranged in the second direction D2 different from the first direction D1.

The sub-gate lines CL1 CL2, . . . , CLn−1 and CLn (only CL1 is shown in FIG. 5) extend in the first direction D1, and are arranged in spaced apart fashion in the second direction D2. The sub-gate lines CL1, CL2, . . . , CLn−1 and CLn are disposed between the gate lines GL1, GL2, . . . , GLn−1 and GLn. For example, the first sub-gate line CL1 may be disposed between the first gate line GL1 and the second gate line GL2. The data lines DL extend in the second direction D2, and are arranged in the first direction D1.

Each of the pixels P (only one shown in FIG. 5) includes first and second transistors TR1 and TR2 connected to the gate line and the data line, a third transistors TR3 connected to the first and second transistors TR1 and TR2 (connected to TR1 via Cup) and the sub-gate line, a first liquid crystal capacitor CLC1 and a first storage capacitor CST1 connected to the first transistor TR1, a second liquid crystal capacitor CLC2 and a second storage capacitor CST2 connected to the second transistor TR2, an a voltage up capacitor Cup and a voltage down capacitor Cdown. The pixels P include the first transistor TR1, a first sub-pixel having a first pixel electrode connected to the first transistor TR1, and a second sub-pixel having a second pixel electrode connected to the second transistor TR2. The first pixel electrode and a drain electrode of the third transistor TR3 overlap with each other to define the down capacitor Cdown, and the drain electrode of the third transistor TR3 and a storage line overlap with each other to define the up capacitor Cup.

The gate driving circuit 220, the wiring part 230, the signal pad part 232 and the fan out part FO are formed in the peripheral area PA1 and PA2. The peripheral areas PA1 and PA2 defined as a first end area PA1 and a second end area PA2, and the first end area PA1 defined as first and second areas AE1 and AE2 are substantially the same as those in FIG. 1. Thus, any repetitive explanation concerning the above elements will be omitted.

The gate driving circuit 220 is connected to end portions of the gate lines GL1, GL2, . . . , GLn−1 and GLn, and outputs the gate signal to the gate lines GL1, GL2, . . . , GLn−1 and GLn. The gate driving circuit 220 is formed in the first end area PA1 adjacent to the display area DA. The gate driving circuit 220 is formed in the first area AE1, and is entirely covered by the alignment film.

The wiring part 230 receives driving signals driving the gate driving circuit 220 from outside and transmits the driving signals to the gate driving circuit 220. For example, the wiring part 230 includes a Vss voltage supplying line 241 transmitting a voltage supply signal VSS, a first clock line 242a transmitting a first clock signal CK1, a second clock line 243a transmitting a second clock signal CK2, a third clock line 242b transmitting a third clock signal CK3, a fourth clock line 243b transmitting a forth clock signal CK4, a fifth clock line 242c transmitting a fifth clock signal CK5, a sixth clock line 243c transmitting a sixth clock signal CK6, a first starting line 244a transmitting a first vertical start signal STV1 and a second starting line 244b transmitting a second vertical start signal STV2. The wiring part 230 further includes a plurality of voltage supply cross-connecting lines 245 and a plurality of clock cross-connecting lines 246. In one embodiment, CK2 is out of phase (e.g., 180°) with CK1, CK4 is out of phase (e.g., 180°) with CK3 CK6 is out of phase (e.g., 180°) with CK5.

Each of the first, second, third, fourth, fifth and sixth clock lines 242a, 243a, 242b, 243b, 242c and 243c and each of the first and second starting lines 244a and 244b extend in the second direction D2, and are arranged in the first direction D1 in parallel. The second starting line 244b, the first starting line 244a, and the sixth, fourth, second, fifth, third and first clock lines 243c, 243b, 243a, 242c, 242b and 242a are disposed in the recited order progressively away from the gate driving circuit 220. Thus, the Vss voltage supplying cross-connecting lines 245 cross with the first, second, third, fourth, fifth and sixth clock lines 242a, 243a, 242b, 243b, 242c and 243c.

Detailed structures and connections of the gate driving circuit 220, the display area DA and the wiring part 230 are explained below referring to FIG. 6.

Figure 6:
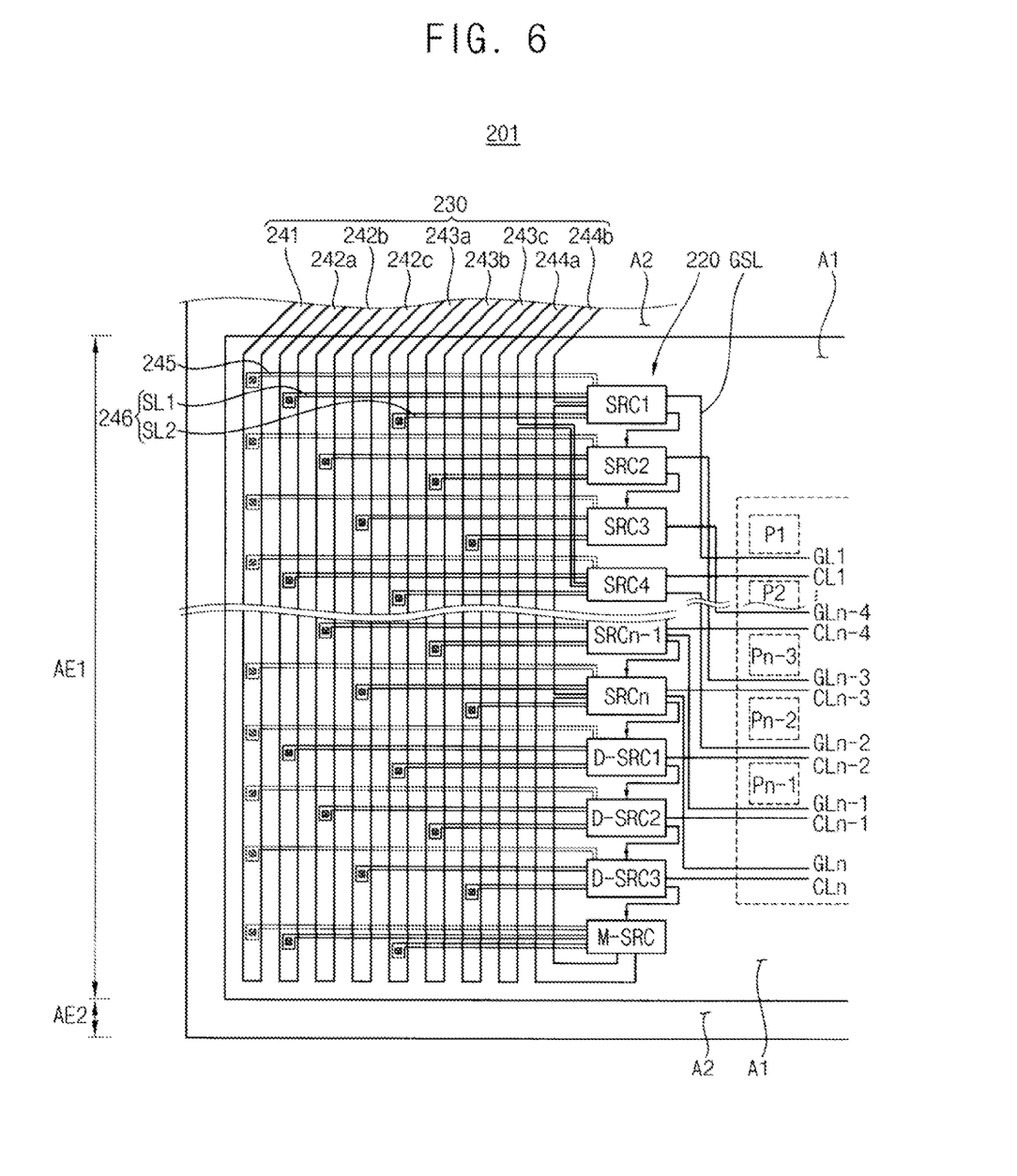
FIG. 6 is an enlarged plan view illustrating the display substrate in FIG. 5.

FIG. 6 is an enlarged plan view illustrating the display substrate in FIG. 5.

Referring to the FIG. 6, the gate driving circuit 220 includes circuit stages SRC1, SRC2, . . . , SRCn−1 and SRCn, single stages D-SRC1, D-SRC2 and D-SRCn, and a final dummy stage M-SRC. The single stages D-SRC1, D-SRC2 and D-SRCn are sequentially connected from the n-th circuit stage SRCn that is a last circuit stage, and the dummy stage M-SRC is connected to the third single stage D-SRC3 that is the last single stage of the single stages D-SRC1, D-SRC2 and D-SRC3.

Each of the circuit stages SRC1, SRC2, . . . , SRCn−1 and SRCn is connected to the voltage supplying line 241 through a respective Vss voltage supplying cross-connecting line 245, and connected to the first, third and fifth clock lines 242a, 242b and 242c through the first sub-line SL1 of the clock cross-connecting lines 246, and connected to the second, fourth and sixth clock lines 243a, 243b and 243c through the second sub-line SL2 of the clock cross-connecting lines 246. The dummy stage M-SRC is also connected to the voltage supplying line 241 through the voltage supplying cross-connecting line 245, and connected to the first clock line 242a and the second clock line 243a through the first and second sub-lines SL1 and SL2. For example, a first stage SRC1 is connected to the first clock line 242a and the second clock line 243a. In addition, a second stage SRC2 is connected to the third clock line 242b and the fourth clock line 243b.

The first circuit stage SRC1 is connected to the first gate line GL1, and the second circuit stage SRC2 is connected to the second gate line GL2 adjacent to the first gate line GL1 along the second direction D2. In addition, the n-th circuit stage SRCn is connected to the n-th gate line CLn that is a last gate line adjacent to the lower portion of the display area DA. In addition, the third circuit stage SRC3 and the fourth circuit stage SRC4 are respectively connected to the third gate line GL3 and the fourth gate line GL4. Each of the first, second and third circuit stages SRC1. SRC2 and SRC3 is connected to one gate line, but the fourth circuit stage SRC4 is connected to the fourth gate line GL4 and the first sub-gate line CL1. From the fourth circuit stage SRC4 to the n-th circuit stage SRCn, each of the circuit stages is connected to one gate line and one sub-gate line. Hereinafter, the stages connected one gate line are defined as first sub-stages, and one circuit stage connected to one gate line and one sub-gate line is defined as second sub-stages. The stage connected to a last second sub-stage of the second stages and one sub-gate line is defined as a third sub-stage. For example, each of the first sub-stages is connected to the first gate line GL1 to the m-th gate line GLm ('m' is a natural number greater than 1) of the gate lines GL1, GL2, . . . , GLn−1 and GLn. In this case, the m may be a natural number not less than 2. Each of the second sub-stages is connected to the (m+1)-th to n-th gate lines GLm+1 to GLn ('n' is a natural number more than 'm') and the first to (n−m)-th sub-gate lines CL1 to CLn−m. In this case, the n may be a natural number no less than 3. The third sub-stages are connected to the ((n−m)+1)-th to n-th sub-gate lines CLn−m+1 to CLn.

According to the present example embodiment, where m is 3, the first, second and third circuit stages SRC1, SRC2 and SRC3 are the first sub-stages, the fourth circuit stage SRC4 to the n-th circuit stage SRCn are the second sub-stages, and the single stages D-SRC1, D-SRC2 and D-SRC3 connected to the (n−2)-th to n-th sub-gate lines CLn−2 to CLn are the third sub-stage.

The first pixel P1 is connected to the first gate line GL1 connected to the first circuit stage SRC1 and the first sub-gate line CL1 connected to the fourth circuit stage SRC4. In addition, the n-th pixel Pn that is the last pixel is connected to the n-th gate line GLn connected to the n-th circuit stage SRCn and the n-th sub-gate line CLn connected to the last third single stage D-SRC3.

The first, second and third single stages SRC1, SRC2, SRC3, . . . , SRCn, D-SRC1, D-SRC2 and D-SRC3 are respectively disposed in a direction toward to the upper portion of the display area DA with respect to the gate lines GL1, GL2, . . . , GLn−1 and GLn. For example, the first circuit stage SRC1 is disposed in the direction toward to the upper portion of the display area DA of the first gate line GL1. In addition, the n-th circuit stage SRCn is disposed in the direction toward the upper portion of the display area DA of the n-th gate line GLn.

As mentioned above, due to the arrangement of the first to n-th circuit stages SRC1, SRC2, SRC3, . . . , SRCn, the first to third single stages D-SRC1, D-SRC2 and D-SRC3, and the gate lines GL1 GL2, . . . , GLn−1 and GLn, the display substrate 201 includes a plurality of gate connecting lines GSL connecting the first to n-th circuit stages SRC1, SRC2, SRC3, . . . , SRCn to the gate lines GL1, GL2, . . . , GLn−1 and GLn, respectively which are disposed lower in the display area DA. The gate connecting lines GSL are formed in the first end area PA1 between the display area DA and the gate driving circuit 220. Each of the gate connecting lines GSL extends in the second direction D2 to connect the first to n-th circuit stages SRC1, SRC2, SRC3, . . . , SRCn to the gate lines GL1, GL2, . . . , GLn−1 and GLn.

According to the present example embodiment, though the alignment film area A1 is designed as a contiguous rectangular shape in a plan view, the gate driving circuit 220 is entirely formed in the first area AE1 and the gate connecting line GSL connects the gate driving circuit 220 and the gate lines GL1, GL2, . . . , GLn−1 and GLn, and thus a portion in which the Vss voltage supplying cross-connecting lines 245 cross over with the first, second, third, fourth, fifth and sixth clock lines 242a, 243a, 242b, 243b, 242c and 243c may be entirely formed in the first area AE1 that is the alignment film area A1. Accordingly, the gate driving circuit 220 is covered by the alignment film, so a burn out or short-circuit between the Vss voltage supplying cross-connecting lines 245 and the first, second, third, fourth, fifth and sixth clock lines 242a, 243a, 242b, 243b, 242c and 243c formed form metals different from each other may be prevented.

Therefore, the lower portion of the gate driving circuit 220 is aligned substantially the same as the lower portion of the display area DA without changing a plane design of the alignment film area A1, so that the reliability of the arrangement in forming the alignment film may be enhanced.

Figure 7:
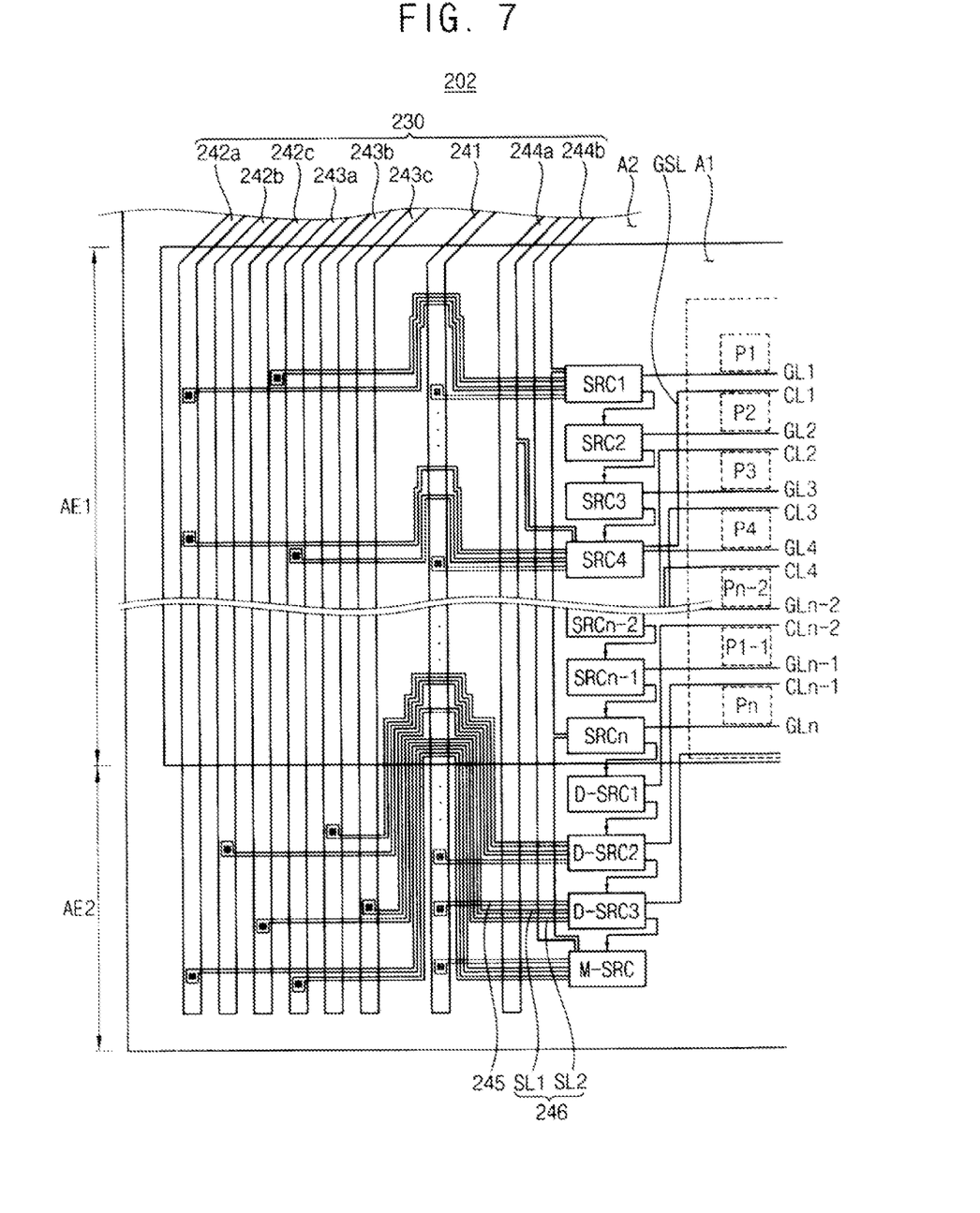
FIG. 7 is an enlarged plan view illustrating a display substrate according to still another example embodiment.

FIG. 7 is an enlarged plan view illustrating a display substrate according to still another example embodiment.

Referring to FIG. 7, the display substrate 202 according to the present example embodiment includes the gate lines GL1, GL2, . . . , GLn−1 and GLn, the sub-gate lines CL1, CL2, . . . , CLn−1 and CLn, the pixels P1, P2, . . . , Pn−1 and Pn, the gate driving circuit 220 and a wiring part 230. The display substrate 202 according to the present example embodiment of is substantially the same as the display substrate according to the previous example embodiment in FIGS. 5 and 6 except for an arrangement of the gate driving circuit 220, a connection of the gate driving circuit 220 with the gate lines GL1, GL2, . . . , GLn−1 and GLn, and a design of the wiring part 230. Thus, any repetitive explanation concerning the above elements will be omitted.

The gate driving circuit 220 is formed in the first area AE1 and the second area AE2. The first area AE1 is a portion of the alignment film area A1 and the second area AE2 is a portion of the alignment film free area A2. For example, a first circuit stage SRC1 to an n-th circuit stage SRCn of the gate driving circuit 220 are formed in the first area AE1, and the single stages D-SRC1, D-SRC2 and D-SRC3 and the dummy stage M-SRC are formed in the second area AE2.

The first circuit stage SRCn to the n-th circuit stage SRCn are directly connected to the gate lines GL1, GL2, . . . , GLn−1 and GLn extending in the first direction D1 of the display substrate 202 respectively without additional connecting lines. The first pixel P1 (having GL1 and CL1 as its adjacent lines) is connected to the first gate line GL1 of the first circuit stage SRC1, the second pixel P2 is connected to the second gate line GL2 of the second circuit stage SRC2, and the third pixel P3 is connected to the third gate line of the third circuit stage SRC1.

In addition, the fourth to n-th circuit stages SRC4, SRC5, . . . , SRCn−1 and SRCn are disposed in a direction toward to the lower portion of the display area DA with respect to a sub-gate line connected with each of the fourth to n-th gate lines SRC4, SRC5, . . . , SRCn−1 and SRCn. For example, the fourth circuit stage SRC4 (that drives CL1) is disposed at the lower portion of the first sub-gate line CL1 connected with the fourth circuit stage. Thus, the fourth circuit stage SRC4 is electrically connected to the first pixel P1 and the fourth pixel P4. The first single stage D-SRC1 is disposed at the lower portion of the n-th sub-gate line CLn. The single stages D-SRC1, D-SRC2 and D-SEC3 are connected to the (n−2)-th, (n−1)-th and n-th sub-gate lines CLn−2, CLn−1 and CLn and disposed at the lower portion of the (n−2)-th, (n−1)-th and n-th sub-gate lines CLn−2, CLn−1 and CLn, respectively.

Due to the arrangement of the first to n-th circuit stages SRC1, SRC2, SRC3 SRC4, . . . , SRCn−1 and SRCn, the single stages D-SRC1, D-SRC2 and D-SRC3 the gate lines GL1, GL2, ..., GLn−1 and GLn and the sub-gate lines CL1, CL2, ..., Cln−1 and CLn as mentioned above, the display substrate 202 includes the gate connecting lines GSL connecting the fourth to n-th circuit stages SRC4, ..., SRCn−1 and SRCn and the single stages D-SRC1, D-SRC2 and D-SRC3 to the sub-gate lines CL1, CL2, ..., CLn−1 and CLn, respectively. The gate connecting lines GSL are formed in the first end area PA1 between the display area DA and the gate driving circuit 220. Each of the gate connecting lines GSL extends in the second direction D2 to connect the fourth to n-th circuit stages SRC4, ..., SRCn−1 and SRCn and the single stages D-SRC1, D-SRC2 and D-SRC3 to the sub-gate lines CL1 CL2, ..., CLn−1 and CLn. In this case, each of the sub-gate lines CL1, CL2, ..., CLn−1 and CLn is disposed at the upper portion of the display substrate 202 with respect to each of the fourth to n-th circuit stages SRC4, ..., SRCn−1 and SRCn and the single stages D-SRC1, D-SRC2 and D-SRC3.

The first and second starting lines 244a and 244b, the Vss voltage supplying line 241, the sixth, fourth and second clock lines 243c, 243b and 243a, the fifth, third and first clock lines 242c, 242b and 242a of the wiring part 230 are disposed in the recited order progressing away from the gate driving circuit 220. The first sub-line SL1 of the clock cross-connecting lines 246 connecting the gate driving circuit 220 to the second, fourth and the sixth clock lines 243a, 243b and 243c, and the second sub-line SL2 connecting the first sub-line SL1 to the first, third and fifth clock lines 242a, 242b and 242c cross over with the Vss voltage supplying line 241.

The dummy stage M-SRC and the single stages D-SRC1, D-SRC2 and D-SRC3 are also connected to the second, fourth and sixth clock lines 243a, 243b and 243c and the first, third and fifth clock lines 242a, 242b and 242c through the first and second sub-lines SL1 and SL2. The first and second sub-lines SL1 and SL2 connected to the dummy stage M-SRC extend in the second direction D2 toward the upper portion of the display area DA in the second area AE2 in which the dummy stage M-SRC is formed. The first and second sub-lines SL1 and SL2 extending in the second direction D2 reach the first area AE1 and intersect with the voltage supplying line 241 in the first area AE1. Then, the first and second sub-lines SL1 and SL2 extend again in the second direction D2 toward the lower portion of the display area DA and are connected to the second, fourth and sixth clock lines 243a, 243b and 243c and the first, third and fifth clock lines 242a, 242b and 242c.

In addition, the first and second sub-lines SL1 and SL2 connected to each of the single stages D-SRC1, D-SRC2 and D-SRC3 extend toward the upper portion of the display area DA in the second area AE2 in which the single stages D-SRC1, D-SRC2 and D-SRC3 are formed, and intersect with the second, fourth and sixth clock lines 243a, 243b and 243c and the first, third and fifth clock lines 242a, 242b and 242c in the first area AE1. A design of the first and second sub-lines SL1 and SL2 connected to each of the single stages D-SRC1, D-SRC2 and D-SRC3 is substantially same as that of the first and second sub-lines SL1 and SL2 connected to the dummy stage M-SRC.

According to the present example embodiment, though the alignment film area A1 is designed as a contiguous rectangular shape in a plan view and a portion of the gate driving circuit 220 is formed in the second area AE2, a portion in which the first and second sub-lines SL1 and SL2 intersect with the voltage supplying line 241 may be entirely formed in the first area AE1 of the alignment film area A1 by changing the design of the first and second sub-lines SL1 and SL2. Thus, a burn out or short-circuit between the first and second sub-lines SL1 and SL2, and the Vss voltage supplying line 241 formed by different metals from each other may be prevented. In addition, the area in which the first and second sub-lines SL1 and SL2, and the voltage supplying line 241 cross each other is entirely disposed in the first area AE1 without changing the plane design of the alignment film area A1, so that the reliability of arrangement in forming the alignment film may be enhanced.

Figure 8:
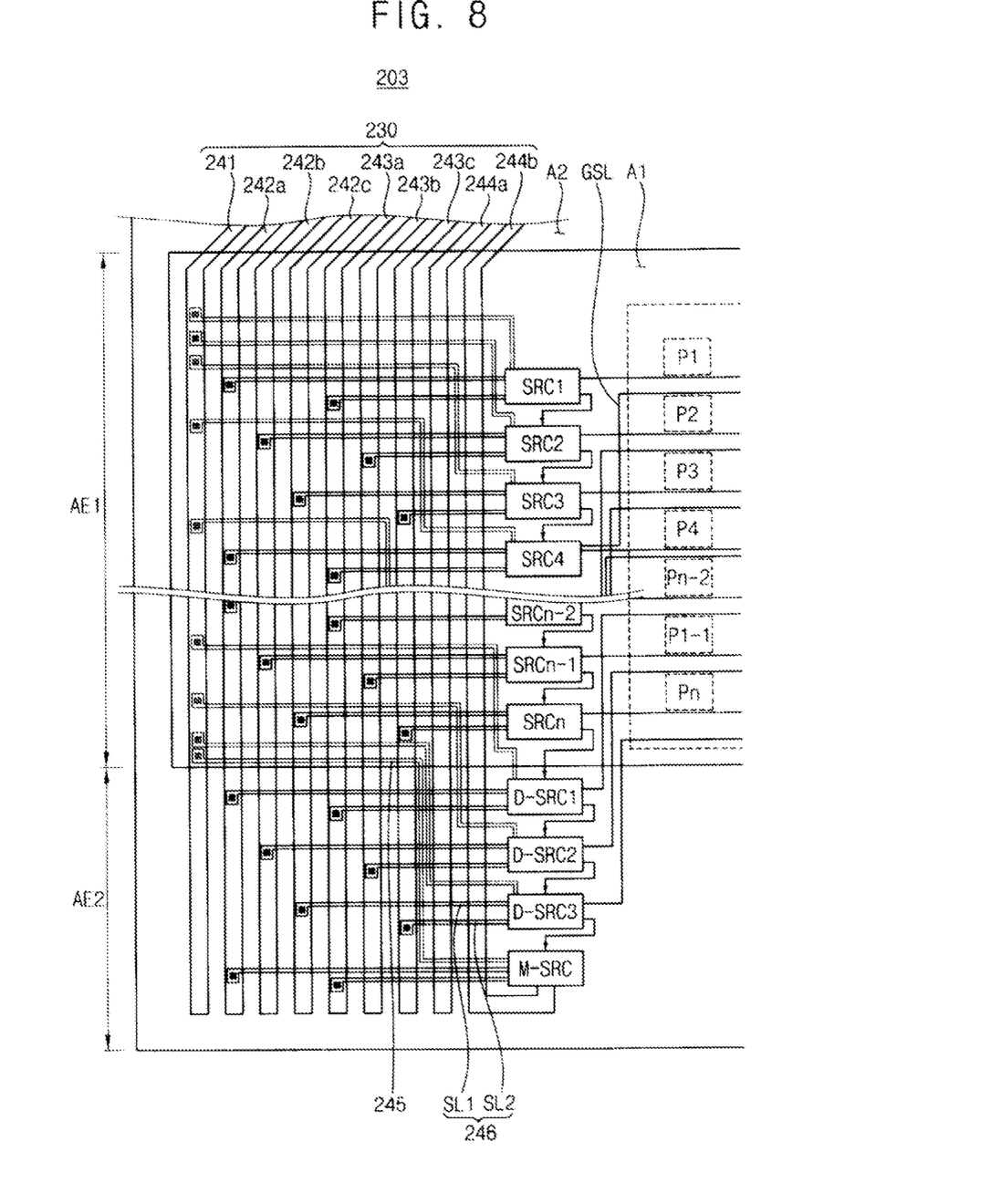
FIG. 8 is an enlarged plan view illustrating a display substrate according to still another example embodiment.

FIG. 8 is an enlarged plan view illustrating a display substrate according to still another example embodiment.

Referring to FIG. 8, the display substrate 203 according to the present example embodiment includes the gate lines GL1, GL2, ..., GLn−1 and GLn, the pixels P1, P2, ..., Pn−1 and Pn, the driving circuit 220 and the wiring part 230. The display substrate 203 according to the present example embodiment is substantially the same as the display substrate according to the previous example embodiment in FIG. 7 except for the layout of Vss line 241 and the corresponding Vss cross-connect lines 245. Thus, any repetitive explanation concerning the above elements will be omitted.

The wiring part 230 includes the starting lines 244a and 244b, the first, second, third, fourth, fifth, and sixth clock lines 242a, 243a, 242b, 243a, 242c and 243c, and the Vss voltage supplying line 241. In the present example embodiment, the starting lines 244a and 244b, the sixth, fourth and second clock lines 243c, 243b and 243a, the fifth, third and first clock lines 242c, 242b and 242a, and the voltage supplying line 241 are disposed in the recited order progressing away from the gate driving circuit 220. Each of the circuit stages SRC1, SRC2, ..., SRCn−1 and SRCn of the gate driving circuit 220 is electrically connected to the wiring part 230 through a plurality of voltage supplying cross-connecting lines 245 and a plurality of clock connecting lines 246. The voltage supplying cross-connecting lines 245 intersect with the first, second, third, fourth, fifth and sixth clock lines 242a, 243a, 242b, 243b, 242c and 243c. The wiring part 230 is formed in a first area AE1 that is a portion of the alignment film area A1 and a second area AE2 that is a portion of the alignment film free area A2.

In addition, the dummy stage M-SRC and the single stages D-SRC1, D-SRC2 and D-SRC3 are also connected to the voltage supplying line 241 through the Vss voltage supplying cross-connecting lines 245. The voltage supplying cross-connecting line 245 connected to the dummy stage M-SRC extends in the second direction D2 toward the upper portion of the display area DA in the second area AE2 in which the dummy stage M-SRC is formed. The voltage supplying line 245 extending in the second direction D2 reaches to the first area AE1 and extends in the first direction D1 in the first area AE1 to intersect with the first, second, third, fourth, fifth and sixth clock lines 242a, 243a, 242b, 243b, 242c and 243c. Then, the voltage supplying cross-connecting line 245 extends to the voltage supplying line 241 and is connected to the voltage supplying line 241 disposed in the first area AE1.

The voltage supplying cross-connecting line 245 connected to each of the single stages D-SRC1, D-SRC2 and D-SRC3 extends along the second direction D2 in the second area AE2 in which the single stages D-SRC1, D-SRC2 and D-SRC3 are formed toward the upper portion of the display area DA. Thus, the voltage supplying cross-connecting line 245 may intersect with the first, second, third, fourth, fifth and sixth clock lines 242a, 243a, 242b, 243b, 242c and 243c in the first area AE1.

According to the present example embodiment, though the alignment film area A1 is designed as a contiguous rectangular shape in a plan view and a portion of the gate driving circuit 220 is formed in the second area AE2, a portion in which the voltage supplying cross-connecting lines 245 intersect with the first, second, third, fourth, fifth and sixth clock lines 242a, 243a, 242b, 243b, 242c and 243c may be entirely formed in the first area AE1 of the alignment film area A1 by changing the design of the voltage supplying connecting lines 245. Thus, a burn out or short-circuit or other defect between the voltage supplying cross-connecting lines 245 and the first, second, third, fourth, fifth and sixth clock lines 242a, 243a, 242b, 243b, 242c and 243c formed by different metals from each other cross each other may be prevented. In addition, the area in which the voltage supplying connecting lines 245 and the first, second, third, fourth, fifth and sixth clock lines 242a, 243a, 242b, 243b, 242c and 243c cross each other is entirely disposed in the first area AE1 without changing the plane design of the alignment film area A1, so that the reliability of arrangement in forming the alignment film may be enhanced.

The foregoing is illustrative of the teachings and is not to be construed as limiting thereof. Although a few example embodiments have been described, those skilled in the art will readily appreciate in light of the foregoing that many modifications are possible in the example embodiments without materially departing from the novel teachings and advantages disclosed here. Accordingly, all such modifications are intended to be included within the scope of the present teachings. In the claims, means-plus-function clauses are intended to cover the structures described herein as performing the recited function and not only structural equivalents but also functionally equivalent structures to the extent apparent from what is taught here. Therefore, it is to be understood that the foregoing is illustrative and is not to be construed as limited to the specific example embodiments disclosed, and that modifications to the disclosed example embodiments, as well as other example embodiments, are intended to be included within the scope of the provided teachings.

What is claimed is:

1. A display substrate comprising:
   a plurality of spaced apart gate lines each extending in a first direction and formed in a display area of the display substrate;
   a gate driving circuit formed in a peripheral area surrounding the display area, the gate driving circuit including a plurality of circuit stages connected to the gate lines and a dummy stage connected to a last circuit stage of the circuit stages;
   a plurality of gate connecting lines connecting the circuit stages to the gate lines and formed in the peripheral area, each of the gate connecting lines including a portion extending in a second direction crossing the first direction so that the gate connecting lines are substantially entirely shifted to the second direction with respect to the gate lines; and
   a sub-gate line formed adjacent to each of the gate lines in the display area,
   wherein the circuit stages comprise:
   first sub-stages formed in the peripheral area and connected to first to m-th gate lines (m is a natural number) of the gate lines; and
   second sub-stages formed in the peripheral area, connected to (m+1)-th to n-th gate lines (n is a natural number more than m) and connected to first to (n−m)-th sub-gate lines,
   wherein the gate driving circuit further comprises third sub-stages connected to ((n−m)+1)-th to n-th sub-gate lines.

2. The display substrate of claim 1, wherein the gate connecting lines have a L-shape or a S-shape.

3. The display substrate of claim 1, further comprising:
   an alignment film formed in the display area and also in the peripheral area adjacent to end portions of the gate lines in the peripheral area.

4. The display substrate of claim 1, wherein each of the circuit stages being disposed at the higher portion of the gate line corresponding to the circuit stage.

5. The display substrate of claim 1, wherein the dummy stage is connected to a last third sub-stage of the third sub-stages.

6. The display substrate of claim 1, wherein a pixel formed in the display area comprises:
   first and second transistors connected to each of the gate lines; and
   a third transistor connected to a sub-gate line adjacent to the gate line, and the first and second transistors.

7. The display substrate of claim 1, further comprising
   a wiring part adjacent to the gate driving circuit and formed in the peripheral area, wherein the wiring part comprises;
   a Vss voltage supplying line extending in the second direction, and supplying a Vss voltage supply signal;
   a clock line extending in the second direction, and applying a clock signal;
   a voltage supplying cross-connecting line extending in the first direction to connect the Vss voltage supply line to the gate driving circuit; and
   a clock cross-connecting line extending in the first direction to connect the clock line to the gate driving circuit.

8. The display substrate of claim 7, wherein a portion in which the voltage supplying line and the clock connecting line intersect with each other and a portion in which the clock line and the voltage supplying connecting line intersect with each other are disposed in the peripheral area.

9. The display substrate of claim 1, further comprising
   a plurality of single stages,
   wherein the single stages formed in the peripheral area and connected from a last circuit stage of the circuit stages,
   wherein the dummy stage connected to a last single stage of the single stages.

10. The display substrate of claim 9, further comprising
    a sub-gate line formed adjacent to each of the gate lines in the display area,
    wherein the single stages comprise:
    first single stage formed at the lower portion of the n-th sub gate line and connected to (n−2)-th sub-gate line;
    second single stage connected to (n−1)-th sub gate line; and
    third single stage connected to n-th sub-gate line.

* * * * *